United States Patent
Park et al.

(10) Patent No.: US 11,759,977 B2
(45) Date of Patent: Sep. 19, 2023

(54) POLYPROPYLENE RESIN PELLET AND METHOD FOR PREPARING THE SAME

(71) Applicant: LG Chem, Ltd., Seoul (KR)

(72) Inventors: Heekwang Park, Daejeon (KR); Hye Kyung Lee, Daejeon (KR); Ha Na Park, Daejeon (KR); Kyung Seop Noh, Daejeon (KR); Hyunsup Lee, Daejeon (KR); Seong Min Chae, Daejeon (KR); Heon Yong Kwon, Daejeon (KR); Sangjin Jeon, Daejeon (KR); Seok Hwan Kim, Daejeon (KR)

(73) Assignee: LG Chem, Ltd.

( * ) Notice: Subject to any disclaimer, the term of this patent is extended or adjusted under 35 U.S.C. 154(b) by 523 days.

(21) Appl. No.: 16/963,695

(22) PCT Filed: Nov. 4, 2019

(86) PCT No.: PCT/KR2019/014828
§ 371 (c)(1),
(2) Date: Jul. 21, 2020

(87) PCT Pub. No.: WO2020/096306
PCT Pub. Date: May 14, 2020

(65) Prior Publication Data
US 2021/0078205 A1    Mar. 18, 2021

(30) Foreign Application Priority Data

Nov. 6, 2018 (KR) .......... 10-2018-0135451
Nov. 1, 2019 (KR) .......... 10-2019-0138937

(51) Int. Cl.
| C08F 110/06 | (2006.01) |
| C08F 4/6592 | (2006.01) |
| B29B 9/12 | (2006.01) |
| B29K 23/00 | (2006.01) |
| C08K 5/098 | (2006.01) |
| C08K 5/12 | (2006.01) |

(52) U.S. Cl.
CPC .............. *B29B 9/12* (2013.01); *C08F 4/6592* (2013.01); *C08F 110/06* (2013.01); *B29K 2023/12* (2013.01); *C08F 4/65927* (2013.01); *C08K 5/098* (2013.01); *C08K 5/12* (2013.01)

(58) Field of Classification Search
CPC .......................... C08F 110/06; C08F 4/65927
See application file for complete search history.

(56) References Cited

U.S. PATENT DOCUMENTS

| 2003/0197304 A1 | 10/2003 | Cooper et al. |
| 2006/0116490 A1 | 6/2006 | Paczkowski et al. |
| 2009/0012239 A1 | 1/2009 | Morhard et al. |
| 2009/0017710 A1 | 1/2009 | Bugada et al. |
| 2009/0149612 A1 | 6/2009 | Stadlbauer et al. |
| 2009/0259009 A1 | 10/2009 | Fuchs et al. |
| 2010/0233927 A1 | 9/2010 | Standaert et al. |
| 2014/0121325 A1 | 5/2014 | Holtcamp et al. |
| 2014/0121341 A1 | 5/2014 | Holtcamp et al. |
| 2016/0208028 A1 | 7/2016 | Choi et al. |
| 2016/0257703 A1 | 9/2016 | Park et al. |
| 2017/0314172 A1 | 11/2017 | Fiebig et al. |
| 2019/0323155 A1 | 10/2019 | Fiebig et al. |

FOREIGN PATENT DOCUMENTS

| CN | 101312991 A | 11/2008 |
| CN | 101415737 A | 4/2009 |
| CN | 104558819 A | 4/2015 |
| CN | 105555811 A | 5/2016 |
| CN | 105733093 A | 7/2016 |
| EP | 2308923 A1 | 4/2011 |
| EP | 3546489 A1 | 10/2019 |
| EP | 3572441 A1 | 11/2019 |
| JP | 2543548 B2 | 10/1996 |
| JP | 2004003091 A | 1/2004 |
| JP | 2009525375 A | 7/2009 |
| JP | 2010538175 A | 12/2010 |
| KR | 20070092217 A | 9/2007 |
| KR | 20090013229 A | 2/2009 |
| KR | 20090119007 A | 11/2009 |
| KR | 20160045433 A | 4/2016 |
| KR | 20170087493 A | 7/2017 |
| WO | 2006082176 A1 | 8/2006 |
| WO | 2006136451 A1 | 12/2006 |
| WO | 2007045603 A1 | 4/2007 |
| WO | 2007088204 A2 | 8/2007 |
| WO | 2014070655 A1 | 5/2014 |
| WO | 2016096690 A1 | 6/2016 |

OTHER PUBLICATIONS

International Search Report for Application No. PCT/KR2019/014828, dated Feb. 17, 2020, pp. 1-2.
Extended European Search Report for Application No. 19882014.4, dated Sep. 9, 2021, 11 pages.
Search Report dated Jul. 15, 2022 from Office Action for Chinese Application No. 201980011887.5 dated Jul. 20, 2022. 3 pgs.

*Primary Examiner* — Caixia Lu
(74) *Attorney, Agent, or Firm* — Lerner David LLP

(57) ABSTRACT

The present invention provides a polypropylene resin pellet that is environment friendly, has excellent workability, and enables preparation of fine denier fiber, and a method for preparing the same.

15 Claims, 9 Drawing Sheets

[FIG. 1]
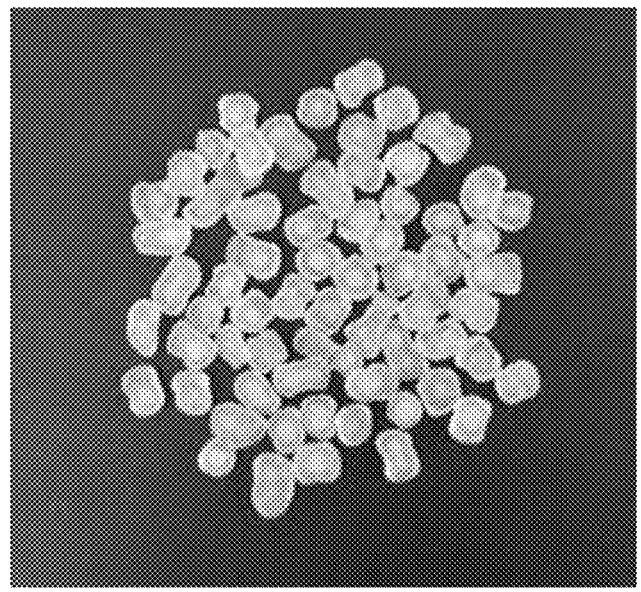
[FIG. 2]
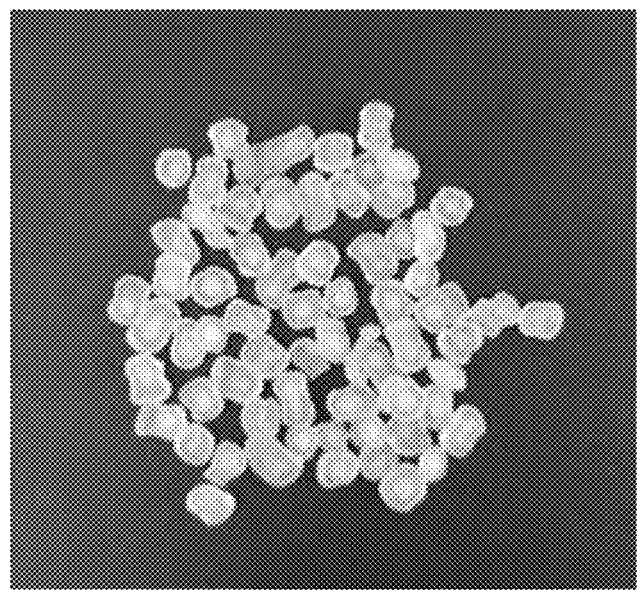

[FIG. 3]
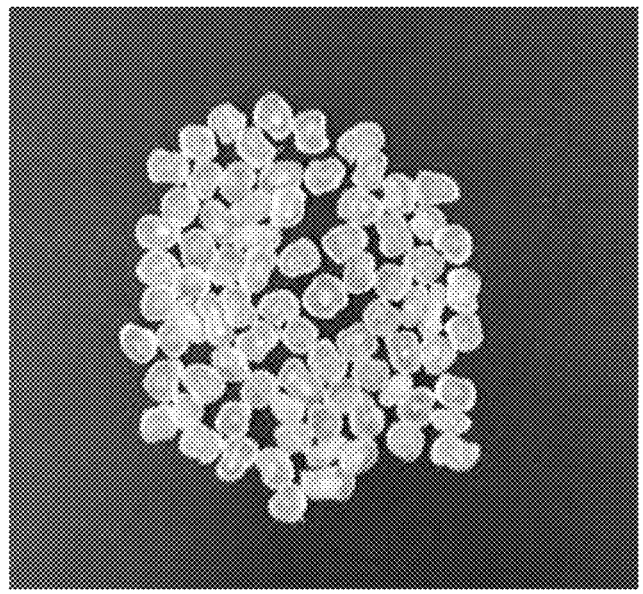
[FIG. 4]
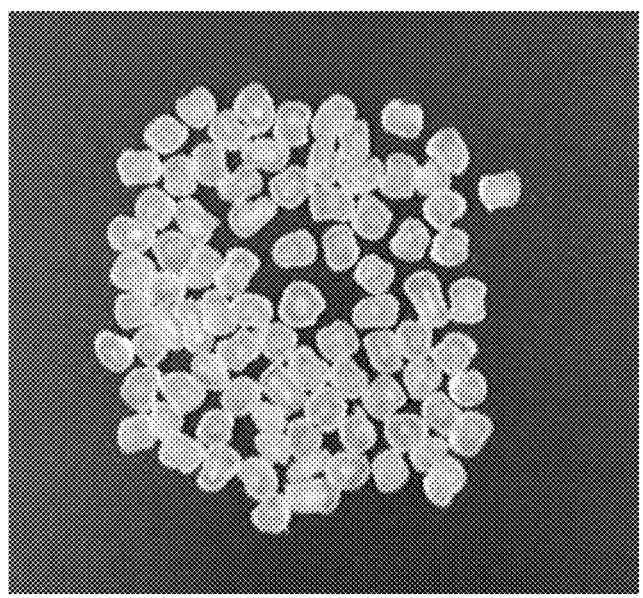

[FIG. 5]
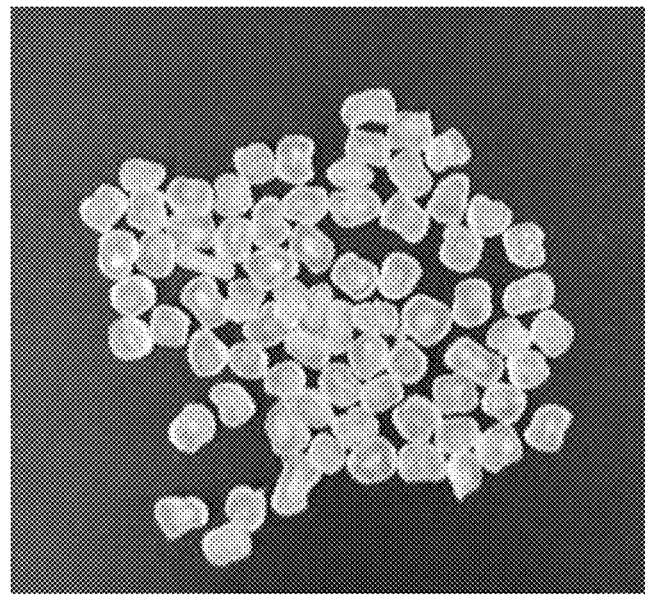
[FIG. 6]

[FIG. 7]
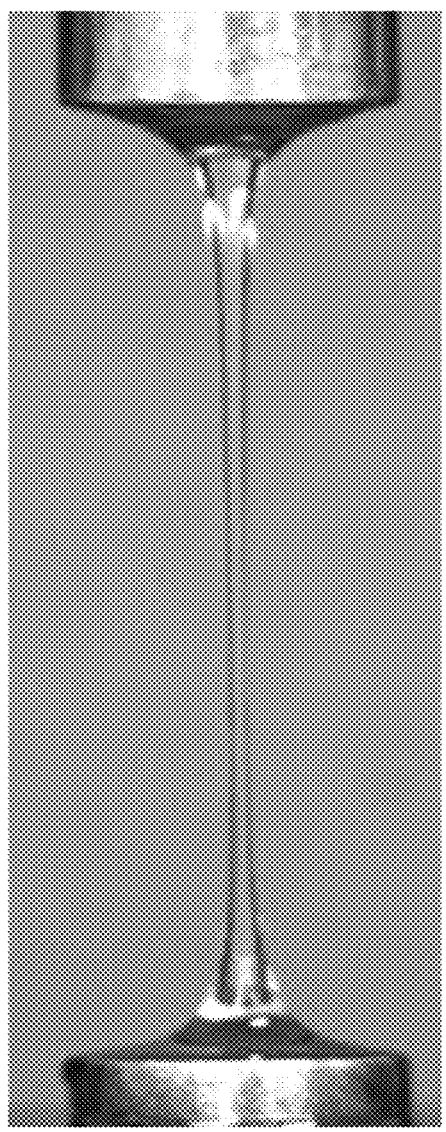

[FIG. 8]
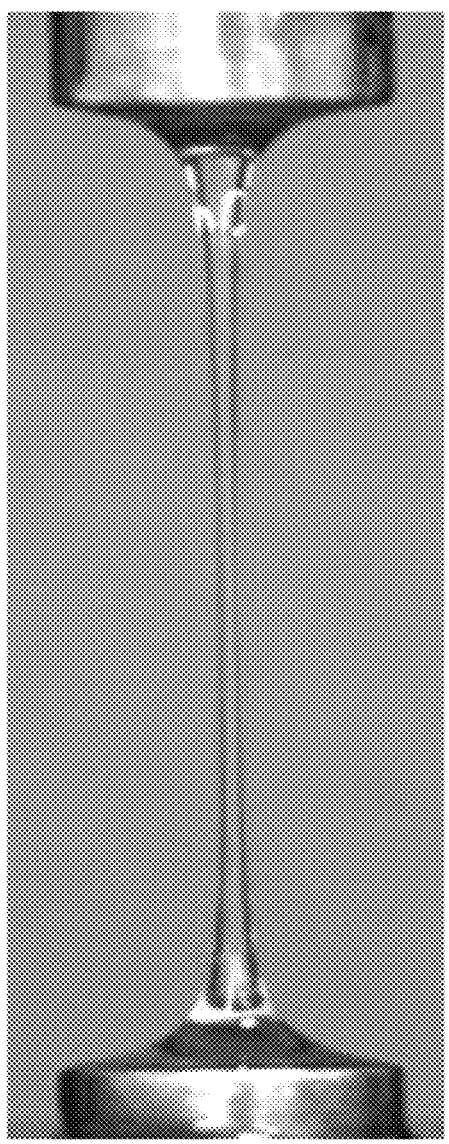

[FIG. 9]
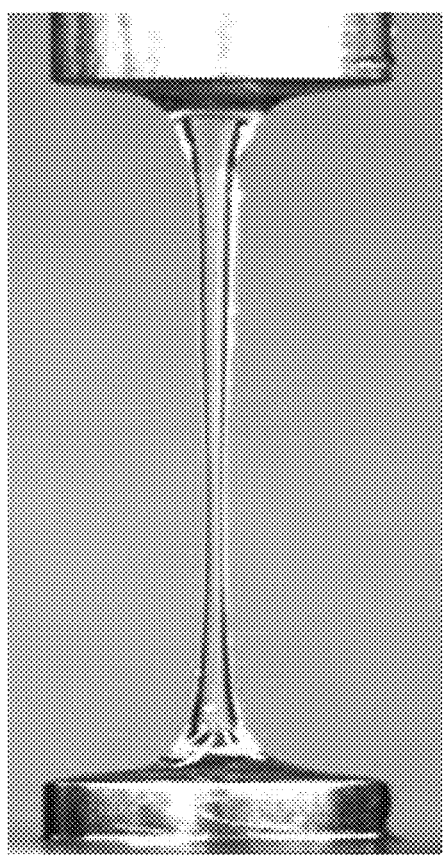

[FIG. 10]
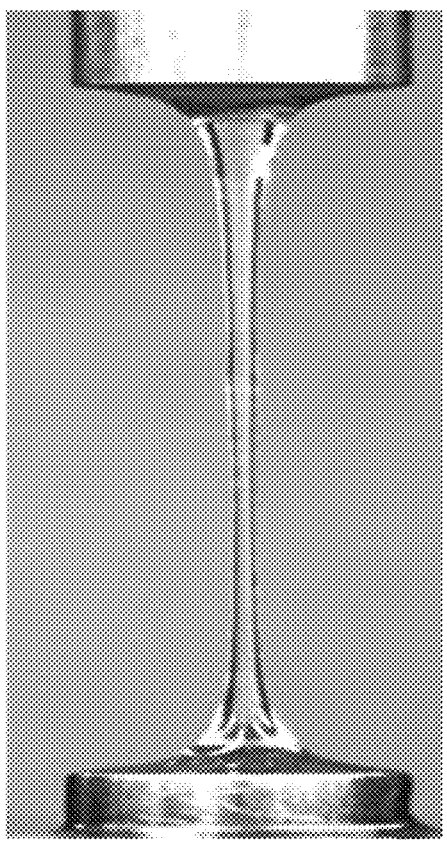

[FIG. 11]
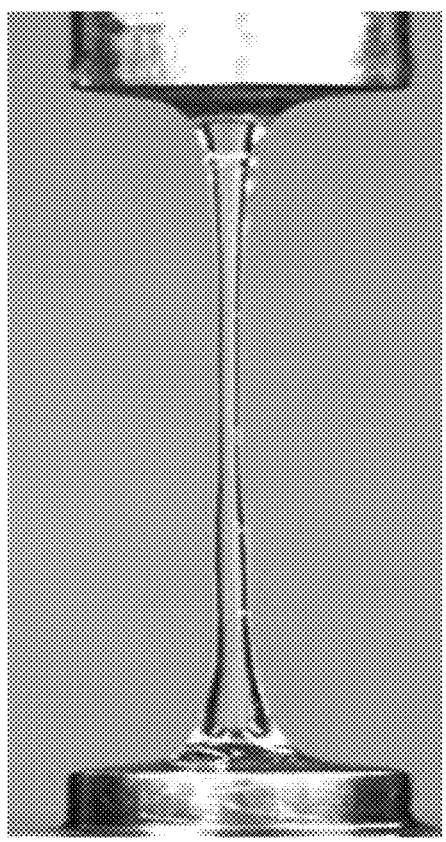

[FIG. 12]
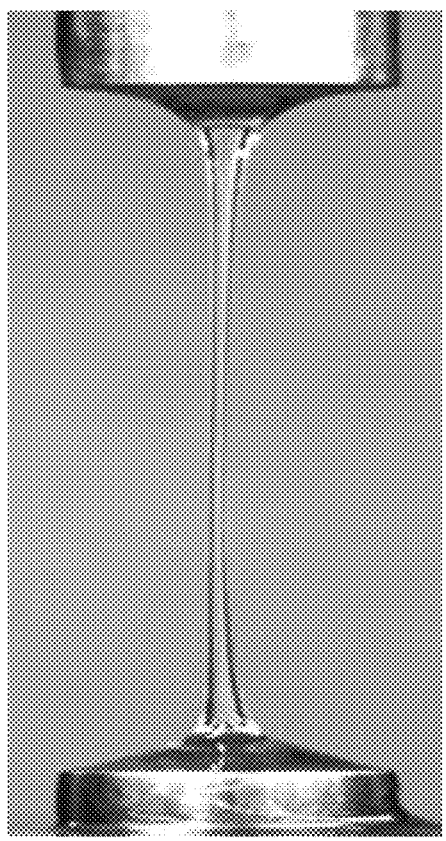

POLYPROPYLENE RESIN PELLET AND METHOD FOR PREPARING THE SAME

CROSS-REFERENCE TO RELATED APPLICATIONS

This application is a national phase entry under 35 U.S.C. § 371 of International Application No. PCT/KR2019/014828 filed Nov. 4, 2019, which claims priority from Korean Patent Application No. 10-2018-0135451 filed Nov. 6, 2018, and Korean Patent Application No. 10-2019-0138937 filed Nov. 1, 2019, all of which are incorporated herein by reference.

TECHNICAL FIELD

The present invention relates to a polypropylene resin pellet that is environment-friendly, has excellent workability, and enables preparation of fine denier fiber, and a method for preparing the same.

BACKGROUND ART

Polypropylene has been used as commercial resin in various fields, due to low specific gravity, high heat resistance, and excellent processability and chemical resistance.

Although highly flowable homopolypropylene is widely used as melt blown fiber, in fiber industries, there is a continuously growing demand for pellet-type material that increase fine denier, thus improving filter efficiency in a filter or mask, which is the main use of the final product, and does not generate fine powders, thus improving workability.

Highly flowable homopolypropylene using commercial Ziegler-Natta catalyst, due to low hydrogen reactivity, produces highly flowable products by a vis-breaking or controlled rheology (CR) process, using a peroxide-based decomposition accelerator during the extrusion process of low MI material. However, due to the limitation of a catalyst having multi active sites, the molecular weight distribution is greater than 3, and thus, there is a limit in increasing fine denier when applied for fiber.

Therefore, there is a need for development of resin simultaneously fulfilling environment-friendliness, fine denier, and workability required for fiber.

DETAILED DESCRIPTION OF THE PRESENT DISCLOSURE

Technical Problem

It is an object of the present invention to provide a polypropylene resin pellet that is environment-friendly, has excellent workability, and enables preparation of fine denier fiber, and a method for preparing the same.

Technical Solution

According to one embodiment of the invention, a polypropylene resin pellet comprising homopolypropylene and fulfilling the following requirements is provided:

melt index measured under load of 2.16 kg at 230° C. according to ASTM D1238: greater than 500 g/10 min
melting point: 155° C. or more
xylene soluble: 1 wt % or less
draw diameter measured at a temperature of 170° C. and drawing speed of 10 mm/s using Discovery Hybrid Rheometer: 0.3 mm or less.

According to another embodiment of the invention, a method for preparing the polypropylene resin pellet is provided, which comprises steps of: polymerizing propylene monomers in the presence of a catalyst composition comprising a transition metal compound of the following Chemical Formula 1, to prepare homopolypropylene; and preparing a composition comprising the homopolypropylene, and then, extruding it at a pellet die temperature of 150 to 190° C.:

[Chemical Formula 1]

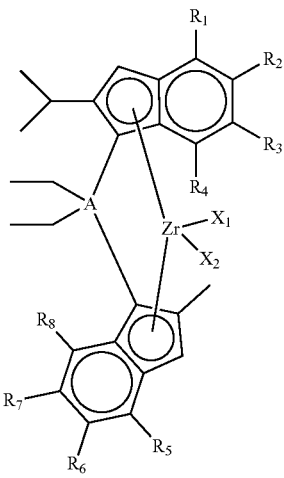

in the Chemical Formula 1,
$X_1$ and $X_2$ are each independently, halogen,
$R_1$ and $R_5$ are each independently, $C_{6-20}$ aryl substituted with $C_{1-20}$ alkyl,
$R_2$ to $R_4$ and $R_6$ to $R_8$ are each independently, hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl, and
A is carbon, silicon or germanium, According to yet another embodiment of the invention, fiber, particularly non-woven fabric, prepared using the polypropylene resin pellet is provided.

Advantageous Effects

The polypropylene resin pellet according to the present invention comprises high flowability homopolypropylene prepared using a metallocene catalyst having high hydrogen reactivity, and thus, it is environment-friendly, exhibits excellent workability because generation of fine particles is reduced, and can make finer denier without using a decomposition accelerator when applied for the preparation of fiber. Thus, it is particularly useful in the field of preparation of fiber requiring excellent filter efficiency such as a filter or mask.

BRIEF DESCRIPTION OF DRAWINGS

FIGS. 1 to 6 are photos respectively observing the polypropylene resins prepared in Examples 1 to 2, and Comparative Examples 1 to 4.

FIGS. 7 to 12 are respectively photos observing drawn resin, when measuring draw diameter of the polypropylene resins prepared in Examples 1 to 2, and Comparative Examples 1 to 4.

DETAILED DESCRIPTION OF THE EMBODIMENTS

The terms used herein are only to explain specific embodiments, and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, a polypropylene resin pellet and a method for preparing the same according to specific embodiments of the invention will be explained In the present invention, when preparing polypropylene resin, homopolypropylene having high flowability prepared using a metallocene compound of the Chemical Formula 1 exhibiting high hydrogen reactivity is used, and is extruded at a controlled pellet die temperature range to pelletize, thereby exhibiting excellent fiber processability without visbreaking using a decomposition accelerator, and enabling preparation of fine denier fiber.

Specifically, a polypropylene resin pellet according to one embodiment of the invention comprises homopolypropylene and fulfills the following requirements:

melt index measured under load of 2.16 kg at 230° C. according to ASTM D1238: greater than 500 g/10 min melting point: 155° C. or more xylene soluble: 1 wt % or less draw diameter measured at a temperature of 170° C. and drawing speed of 10 mm/s using Discovery Hybrid Rheometer: 0.3 mm or less.

As used herein, a pellet or a pellet-type is a small particle or piece formed by extrusion of raw material, and includes all the shape classified as a pellet in the art including circle, flat, flake, polygon, rod shapes, and the like. The size is appropriately determined according to the use and shape and is not specifically limited, but a pellet in the present invention is defined as having an average diameter of 2 mm or more so as to be distinguished from powder having small average diameter of about 1 mm. Specifically, a pellet in the present invention may have an average diameter of 2 mm or more, or 3 mm or more, and 200 mm or less, or 100 mm or less, or 50 mm or less, or 10 mm or less, or 5 mm or less. Wherein, a "diameter" is the longest distance among any straight distances of the outer circumference surface of the pellet, and it may be measured using imaging microscope, and the like.

More specifically, since the polypropylene resin pellet according to one embodiment comprises homopolypropylene having high flowability, it exhibits high melt index (MI) greater than 500 g/10 min. Specifically, melt index (MI) measured under load of 2.16 kg at 230° C. according to ASTM D 1238 may be greater than 500 g/10 min, or 550 g/10 min or more, or 700 g/10 min or more, or 750 g/10 min or more, and 1500 g/10 min or less, or 1450 g/10 min or less, or 1350 g/10 min or less.

Commonly, melt index can be controlled by controlling hydrogen input amount during a polymerization process, and in case the conventional Ziegler-Natta catalyst is used, high content of hydrogen should be introduced in the polymerization step. However, in the present invention, by using a metallocene compound of the Chemical Formula 1 that has high hydrogen reactivity, and thus, exhibits excellent catalytic activity even with decreased hydrogen input, and can prepare low molecular weight polymer due to steric hindrance by the substituent bonded to a ligand, specifically, an isopropyl group, homopolypropylene having high flowability is prepared and included, thus exhibiting high melt index and excellent fiber processability.

In the present invention, fiber processability means that when conducting a drawing process, high ratio drawing is enabled due to uniform molecular weight distribution, thereby preparing more fine denier and high strength fiber.

If MI is 500 g/10 min or less, process pressure may increase and processability may be deteriorated, but since the polypropylene resin pellet according to the present invention has melt index greater than 500 g/10 min, fine denier and high strength fiber can be prepared.

And, the polypropylene resin pellet according to one embodiment of the invention has high melting point (Tm) of 155° C. or more as well as high MI. Since it has such high melting point, it may have increased crystallization temperature and high tacticity, and thus, exhibit excellent heat resistance. If the melting point is less than 155° C., heat resistance may be deteriorated, and it may be decomposed by heat during fiber processing at high temperature. More specifically, the melting point of the polypropylene resin pellet may be 155° C. or more, or 156° C. or more, and considering excellent thermal stability as well as sufficient processability required for injection molding and fiber processing, the melting point may be 170° C. or less, or 160° C. or less.

Meanwhile, the melting point of the polypropylene resin pellet may be measured by increasing the temperature of resin to 200° C. and maintaining at that temperature for 5 minutes, and then, decreasing to 30° C. and increasing again, and determining the top of Differential Scanning calorimeter (TA Instruments) curve as a melting point. Wherein, the temperature increase and decrease speeds are respectively 10° C./min, and the melting point is the result measured in the second temperature rise section.

And, the polypropylene resin pellet according to one embodiment of the invention exhibits high tacticity with xylene soluble (Xs) of 1.0 wt % or less.

In the present invention, xylene soluble is determined by dissolving polypropylene resin in xylene and cooling, crystallizing insoluble parts from the cooled solution, and measuring the content (wt %) of soluble polymer in the crystallized cooled xylene, and xylene soluble includes polymer chains having low tacticity. Thus, as xylene soluble is lower, polymer has higher tacticity. The polypropylene resin according to one embodiment of the invention exhibits low xylene soluble of 1.0 wt % or less, and thus, has high tacticity, and may exhibit excellent rigidity and flexural modulus. The xylene soluble may be controlled by controlling the kind of catalyst used, the content of comonomers, and the like, and considering excellent improvement effect of rigidity and flexural modulus according to the control of xylene soluble, the xylene soluble of the polypropylene resin may be more specifically 0.1 wt % or more, or 0.5 wt % or more, and 0.8 wt % or less, or 0.7 wt % or less.

Meanwhile, in the present invention, the xylene soluble of the polypropylene resin pellet may be measured by introducing xylene in the sample of polypropylene resin, heating at 135° C. for hour, and cooling for 30 minutes, thus progressing pretreatment, and then, flowing xylene at a flow rate of 1 mL/min for 4 hours in OminiSec (Viscotek corporation, FIPA) device to stabilize the base lines of RI, DP, IP, and then, recording the concentration, injection amount of the pretreated sample, and calculating the peak areas.

The polypropylene resin pellet according to one embodiment of the invention may exhibit narrow molecular weight distribution (MWD) of 3 or less due to the characteristic preparation method, as well as the above described MI, Tm and xylene soluble. As such, since it has narrow molecular weight distribution of 3 or less, it exhibits excellent fiber processability and enables preparation of fine denier fiber. More specifically, the MWD may be 2.8 or less, or 2.4 or less, or 2.3 or less, and 2.0 or more, or 2.1 or more, or 2.2 or more.

And, under conditions fulfilling the MWD, the polypropylene resin according to one embodiment of the invention may have weight average molecular weight (Mw) of 60,000 g/mol or less, or 50,000 g/mol or less, or 45,000 g/mol or less, and 30,000 g/mol or more, or 35,000 g/mol or more or 38,000 g/mol or more, and number average molecular weight (Mn) of 16,000 g/mol or more, or 17,000 g/mol or more, and 25,000 g/mol or less, or 22,500 g/mol or less. As explained above, compared to the existing polypropylene resin used for fiber preparation, the polypropylene resin according to one embodiment of the invention not only has equivalent Mw, but also has relatively high Mn, and thus, it can form a uniform polymer structure and exhibit narrow molecular weight distribution, thereby, enabling preparation of fine denier fiber and exhibiting excellent fiber processability.

Meanwhile, in the present invention, molecular weight distribution (MWD) can be determined by measuring weight average molecular weight (Mw) and number average molecular weight (Mn) of polypropylene resin using gel permeation chromatography (GPC), and then, calculating the rate of the weight average molecular weight to the number average molecular weight. Specifically, as the gel permeation chromatography (GPC) device, Waters PL-GPC220 may be used, and Polymer Laboratories PLgel MIX-B 300 mm length column may be used. Wherein, measuring temperature is 160° C., 1,2,4-trichlorobenzene is used as a solvent, and flow rate is set as 1 mL/min. And the polymer samples are respectively prepared in the concentration of 10 mg/10 mL, and then, fed in an amount of 200 µL. Using a calibration curve formed using a polystyrene standard specimen, Mw and Mn values may be derived. Wherein, as the polystyrene standard specimen, 9 kinds having weight average molecular weight of 2,000 g/mol/10,000 g/mol/30,000 g/mol/70,000 g/mol/200,000 g/mol/700,000 g/mol/2,000,000 g/mol/4,000,000 g/mol/10,000,000 g/mol are used.

In addition, the polypropylene resin pellet according to one embodiment of the invention may have high crystallization temperature (Trc) of 115° C. or more. Since it has high crystallization temperature, it is rapidly crystallized during extrusion, and thus, enables preparation of pellet-type resin. More specifically, the crystallization temperature may be 115° C. or more, or 120° C. or more, and 140° C. or less, or 130° C. or less.

In the present invention, the crystallization temperature (Trc) of the polypropylene resin pellet may be measured using Differential Scanning calorimeter (manufactured by TA Instruments), and specifically, the temperature of the resin is increased to 200° C., maintained for 5 minutes, and then, decreased to 30° C., increased again to 200° C. at 10° C./min, and decreased again at 10° C./min, and the top of the DSC curve in the section of decreasing again at 10° C./min is determined as the crystallization temperature.

Since the polypropylene resin pellet according to one embodiment of the invention exhibits high melt index and melting point, and low xylene soluble, it can be drawn at high ratio, and thus, enables preparation of fiber having fine denier and high strength. Moreover, since it has narrow molecular weight distribution and high crystallization temperature, the above effects can be further improved.

Specifically, draw diameter of the polypropylene resin pellet, measured at a temperature of 170° C. and a drawing speed of 10 mm/s using Discovery Hybrid Rheometer (DHR), may be 0.3 mm or less, more specifically, 0.295 mm or less or 0.285 mm or less, and 0.2 mm or more, or 0.25 mm or more. Within the above range, non-woven fabric having fine denier and excellent strength can be prepared.

The polypropylene resin pellet according to one embodiment having the above properties may be prepared by a preparation method comprising polymerizing propylene monomers, in the presence of a transition metal compound of the following Chemical Formula 1 as a catalytically active component, to prepare homopolypropylene; and preparing a composition comprising the homopolypropylene, and then, extruding it at a pellet die temperature of 150 to 190° C. Thus, according to another embodiment of the invention, a method for preparing a polypropylene resin pellet as explained above is provided:

[Chemical Formula 1]

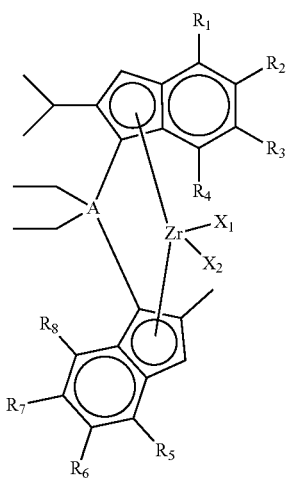

in the Chemical Formula 1, $X_1$ and $X_2$ are each independently, halogen, $R_1$ and $R_5$ are each independently, $C_{6-20}$ aryl substituted with $C_{1-20}$ alkyl, $R_2$ to $R_4$ and $R_6$ to $R_8$ are each independently, hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl, and A is carbon, silicon or germanium.

Unless otherwise limited, the following terms may be defined as follows.

Halogen may be fluorine (F), chlorine (Cl), bromine (Br) or iodine (I).

A $C_{1-20}$ alkyl group may be a linear, branched or cyclic alkyl group. Specifically, a $C_{1-20}$ alkyl group may be a $C_{1-15}$ linear alkyl group; a $C_{1-10}$ linear alkyl group; a $C_{1-5}$ linear alkyl group; a $C_{3-20}$ branched or cyclic alkyl group; a $C_{3-15}$ branched or cyclic alkyl group; or a $C_{3-10}$ branched or cyclic alkyl group. More specifically, a $C_{1-20}$ alkyl group may be a methyl group, an ethyl group, an n-propyl group, an iso-propyl group, an n-butyl group, an iso-butyl group, a tert-butyl group, an n-pentyl group, an iso-pentyl group, a neo-pentyl group, or a cyclohexyl group, and the like.

A $C_{2-20}$ alkenyl group may be a linear, branched or cyclic alkenyl group. Specifically, a $C_{2-20}$ alkenyl group may be a $C_{2-20}$ linear alkenyl group, a $C_{2-10}$ linear alkenyl group, a $C_{2-5}$ linear alkenyl group, a $C_{3-20}$ branched alkenyl group, a $C_{3-15}$ branched alkenyl group, a $C_{3-10}$ branched alkenyl group, a $C_{5-20}$ cyclic alkenyl group or a $C_{5-10}$ cyclic alkenyl group. More specifically, a $C_{2-20}$ alkenyl group may be an ethenyl group, a propenyl group, a butenyl group, a pentenyl group or a cyclohexenyl group, and the like.

A $C_{6-30}$ aryl means a monocyclic, bicyclic or tricyclic aromatic hydrocarbon. Specifically, a $C_{6-30}$ aryl may be a phenyl group, a naphthyl group or an anthracenyl group, and the like.

A $C_{7-30}$ alkylaryl group means a substituent in which one or more hydrogen atoms of aryl are substituted with alkyl. Specifically, a $C_{7-30}$ alkylaryl may be methylphenyl, ethylphenyl, n-propylphenyl, iso-propylphenyl, n-butylphenyl, iso-butylphenyl, tert-butylphenyl or cyclohexylphenyl, and the like.

A $C_{7-30}$ arylalkyl means a substituent in which one or more hydrogen atoms of alkyl are substituted with aryl. Specifically, a $C_{7-30}$ arylalkyl may be benzyl, phenylpropyl or phenylhexyl, and the like.

In the preparation method, the catalyst composition comprises a compound of the Chemical Formula 1 as a single catalyst. Thus, compared to the case of using two or more kinds of catalysts in combination, molecular weight distribution of prepared homopolypropylene may become remarkably narrow.

In addition, since the compound of the Chemical Formula 1 comprises a divalent functional group A di-substituted with ethyl groups, as a bridge group connecting two ligands including indenyl groups, atom size increases compared to the existing carbon bridge, and thus, a usable angle increases, and monomer access may become easy, thereby exhibiting more excellent catalytic activity. And, two ethyl groups bonded to A may increase solubility to improve support efficiency, and can solve the problem of the prior art wherein in case a methyl group is included as the substituent of a bridge, and solubility is poor when preparing a supported catalyst, thus lowering support reactivity.

And, since the $2^{nd}$ positions of two indenyl ligands are respectively substituted with a methyl group and an isopropyl group, low molecular weight polymer can be prepared due to appropriate steric hindrance, and since both indenyl ligands comprise aryl groups substituted with alkyl at the $4^{th}$ positions ($R_1$ and $R_5$), excellent catalytic activity may be exhibited by inductive effect capable of donating sufficient electrons. As the result, long chain branch (LCB) structures may be formed in the structure of homopolypropylene at an appropriate rate/distribution, thereby preparing homopolypropylene having high flowability.

And, since the compound of the Chemical Formula 1 comprises zirconium (Zr) as a center metal, compared to the case of comprising other Group 14 atoms such as Hf, it has more orbitals capable of accepting electrons, and easily bonds to monomers with higher affinity, and thus, exhibit more excellent catalytic activity improvement effect.

More specifically, in the Chemical Formula 1, $R_1$ and $R_5$ may be each independently, a $C_{6-12}$ aryl group substituted with $C_{1-10}$ alkyl, more specifically, a phenyl group substituted with a $C_{3-6}$ branched alkyl group such as a tert-butyl phenyl. And, the substitution position of the alkyl group for the phenyl group may be a $4^{th}$ position corresponding to a para position to $R_1$ or $R_5$ bound to the indenyl groups.

And, in the Chemical Formula 1, $R_2$ to $R_4$ and $R_6$ to $R_8$ may be each independently, hydrogen, $X_1$ and $X_2$ may be each independently, chloro, and A may be silicon.

Representative examples of the compound represented by the Chemical Formula 1 are as follows:

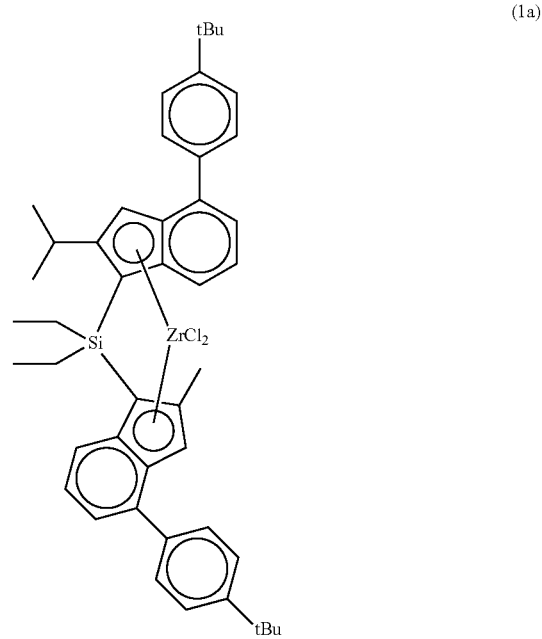

(1a)

The compound of the Chemical Formula 1 may be synthesized using known reactions, and for more detailed synthesis method, preparation examples described below may be referred to.

Meanwhile, the compound of the Chemical Formula 1 may be used as a single component, or it may be used in the state of a support catalyst that is supported on a carrier.

When used in the state of a supported catalyst, particle shape and bulk density of prepared polymer may be excellent, and it may be appropriately used for the conventional slurry polymerization, bulk polymerization, or gas phase polymerization process.

As the carrier, carriers comprising hydroxy groups or siloxane groups on the surface may be used, and preferably, carriers dried at high temperature to remove moisture on the surface, and comprising highly reactive hydroxyl groups and siloxane groups may be used. Specific examples of the carrier may include silica, alumina, magnesia, silica-alumina, silica-magnesia, and the like, and commonly, further comprise oxide, carbonate, sulfate and nitrate components such as $Na_2O$, $K_2CO_3$, $BaSO_4$, and $Mg(NO_3)_2$, and the like.

Among them, in the case of silica, since the silica carrier and the functional group of the metallocene compound are chemically bonded to support, catalysts are hardly released from the carrier surface during a propylene polymerization process, and thus, when preparing homopolypropylene by slurry or gas phase polymerization, fouling wherein polymer particles are adhered to the wall surface of a reactor or to each other may be minimized.

In case the compound of the Chemical Formula 1 is supported on a carrier, and for example, the carrier is silica, the compound of the Chemical Formula 1 may be supported in the content range of 40 μmol or more, or 80 μmol or more, and 240 μmol or less, or 160 μmol or less, based on 1 g of silica. When supported in the above content range, it may exhibit appropriate supported catalyst activity, and thus, may be favorable in terms of catalytic activity maintenance and economical efficiency.

And, the catalyst composition may further comprise a cocatalyst so as to achieve high activity and improve process stability.

The cocatalyst may comprise one or more selected from the group consisting of a compound represented by the following Chemical Formula 2, a compound represented by the following Chemical Formula 3, and a compound represented by the following Chemical Formula 4:

—[Al($R_{11}$)—O]$_m$—  [Chemical Formula 2]

in the Chemical Formula 2, $R_{11}$ may be identical to or different from each other, and each independently, halogen; $C_{1-20}$ hydrocarbon; or $C_{1-20}$ hydrocabon substituted with halogen;

m is an integer of 2 or more;

J($R_{12}$)$_3$  [Chemical Formula 3]

in the Chemical Formula 3, $R_{12}$ may be identical to or different from each other, and each independently, halogen; $C_{1-20}$ hydrocarbon; or $C_{1-20}$ hydrocarbon substituted with halogen;

J is aluminum or boron;

[E-H]$^+$[ZD$_4$]$^-$ or [E]$^+$[ZD$_4$]$^-$  [Chemical Formula 4]

In the Chemical Formula 4,

E is neutral or cationic Lewis base;

H is a hydrogen atom;

Z is Group 13 element;

D's are identical to or different from each other, and each independently, a $C_{6-20}$ aryl group or a $C_{1-20}$ alkyl group of which one or more hydrogen atoms are unsubstituted or substituted with halogen, $C_{1-20}$ hydrocarbon, alkoxy or phenoxy.

Examples of the compound represented by the Chemical Formula 2 may include alkylaluminoxane compounds, such as methylaluminoxane, ethylaluminoxane, isobutylaluminoxane or butylaluminoxane, and the like, and one or a mixture of two or more may be used.

Examples of the compound represented by the Chemical Formula 3 may include trimethyl aluminum, triethyl aluminum, triisobutyl aluminum, tripropyl aluminum, tributyl aluminum, dimethyl chloroaluminum, triisopropyl aluminum, tri-s-butyl aluminum, tricyclopentyl aluminum, trientyl aluminum, triisopentyl aluminum, trihexyl aluminum, trioctyl aluminum, ethyldimethyl aluminum, methyldiethyl aluminum, triphenyl aluminum, tri-p-tollyl aluminum, dimethyl aluminumm methoxide, dimethyl aluminum ethoxide, trimethyl boron, triethyl boron, triisobutyl boron, tripropyl boron, tributyl boron, and the like, and one or a mixture of two or more may be used.

And, examples of the compound represented by the Chemical Formula 4 may include triethylammonium tetraphenylboron, tributylammonium tetraphenylboron, trimethylammonium tetraphenylboron, tripropylammonium tetraphenylboron, trimethylammonium tetra(p-tollyl)boron, trimethylammonium tetra(o,p-dimethylphenyl)boron, tributylammonium tetra(p-trifluoromethylphenyl) boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tollyl)aluminum, tripropylammonium tetra(p-tollyl)aluminum, triethylammonium tetra(o,p-dimethylphenyl)aluminum, tributylammonium tetra(p-trifluoromethylphenyl)aluminum, trimethylammonium tetra (p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, triphenylphosphonium tetraphenylaluminum, trimethylphosphonium tetraphenylaluminum, tripropylammonium tetra(p-tollyl)boron, triethylammonium tetra(o,p-dimethylphenyl)boron, tributylammonium tetra(p-trifluoromethylphenyl) boron, triphenylcarbonium tetra(p-trifluoromethylphenyl)boron, triphenylcarbonium tetrapentafluorophenylboron, and one or a mixture of two or more may be used.

Among the above compounds, the cocatalyst may be more specifically an alkylaluminoxane-based cocatalyst such as methylaluminoxane.

Since the alkylaluminoxane-based cocatalyst comprises a metal element that stabilizes the transition metal compound of the Chemical Formula 1, acts as Lewis acid, and forms a bond through Lewis acid-base interaction with the functional group introduced in the bridge group of the transition metal compound of the Chemical Formula 1, it may further increase catalytic activity.

And, the content of the cocatalyst used may be appropriately controlled according to the properties or the aimed effects of the catalyst and resin composition. For example, in case silica is used as the carrier, the cocatalyst may be supported in the content of 8 mmol or more, or 10 mmol or more, and 25 mmol or less, or 20 mmol or less, based on 1 g of silica.

The catalyst composition having the above construction may be prepared by a preparation method comprising steps of supporting a cocatalyt compound on a carrier, and supporting the compound represented by the Chemical Formula 1 on the carrier, wherein the support sequence of the cocatalyst and the compound of the Chemical Formula 1 may vary. Considering the effect of a supported catalyst having a structure determined according to the support sequence, the transition metal compound may be supported after a cocatalyst is supported, so as to realize high catalytic activity and excellent process stability.

Meanwhile, the homopolypropylene may be prepared by a polymerization process of contacting the catalyst composition comprising the transition metal compound of the Chemical Formula 1 and propylene monomers in the presence or absence of hydrogen gas.

Wherein, the hydrogen gas performs a function for activating non-active site of the metallocene catalyst and causing a chain transfer reaction, thereby controlling molecular weight. The metallocene compound of the present invention has excellent hydrogen reactivity, and thus, by controlling the amount of the hydrogen gas during the polymerization process, polypropylene having desired molecular weight and melt index may be effectively obtained.

The hydrogen gas may be introduced in an amount of 300 ppm or more, or 500 ppm or more, or 700 ppm or more, and 2500 ppm or less, or 1000 ppm or less, or 900 ppm or less, based on the total weight of propylene monomers. By progressing polymerization while feeding hydrogen gas in the above amount, homopolypropylene having narrow molecular weight distribution and high flowability may be prepared.

Meanwhile, a polymerization reaction for the preparation of homopolypropylene may be conducted by a continuous polymerization process, and for example, various polymerization processes known as a polymerization reaction of olefin monomers including continuous solution polymerization, bulk polymerization, suspension polymerization, slurry polymerization, or emulsion polymerization may be used. Particularly, in order to realize narrow molecular weight distribution and high flowability of the prepared homopolypropylene and commercially produce products, a continuous bulk slurry polymerization process wherein a catalyst, propylene monomers, and optionally, hydrogen gas are continuously introduced.

And, the polymerization reaction may be conducted at a temperature of 40° C. or more, or 60° C. or more, or 70° C. or more, and 110° C. or less or 100° C. or less, and under pressure of 1 kgf/cm$^2$ or more, or 5 kgf/cm$^2$ or more, and 100 kgf/cm$^2$ or less, or 50 kgf/cm$^2$ or less. By progressing polymerization under such temperature and pressure, aimed high flowability homopolypropylene may be prepared with high yield.

And, during the polymerization reaction, trialkylaluminum such as triethylaluminum may be optionally, further introduced in the content of 0.01 wt % or more, or 0.05 wt % or more, or 0.1 wt % or more, and 1 wt % or less, or 0.5 wt % or less, based on the total weight of the propylene monomers. If moisture or impurities exist in a polymerization reactor, a part of catalyst may be decomposed, but since the trialkylaluminum functions for previously scavenging moisture or impurities existing in the reactor, it can maximize the activity of a catalyst used, and thus, prepare homopolypropylene fulfilling the above property requirements with higher yield.

And, in the polymerization reaction, the catalyst composition may be used in the form of a mud catalyst mixed with oil and grease. In this case, compared to the conventional case wherein during propylene polymerization, a catalyst composition is used while dissolved or diluted in a C5-12 aliphatic hydrocarbon solvent, for example, pentane, hexane, heptanes, nonane, decane and isomers thereof, an aromatic hydrocarbon solvent such as toluene, benzene, a hydrocarbon solvent substituted with a chlorine atom such as dichloromethane, chlorobenzene, the amount of volatile organic compounds contained in the prepared resin may be remarkably decreased, and thus, odors resulting therefrom may be also decreased.

Homopolypropylene prepared through the above explained polymerization process exhibits narrow molecular weight and high flowability due to the use of a metallocene compound having high hydrogen reactivity. Thus, when preparing polypropylene resin pellets, it may exhibit excellent fiber processability without a visbreaking process, and there is no concern about generation of odor caused by a molecular weight controlling agent in the prepared resin because a molecular weight controlling agent used in the visbreaking process is not used.

Next, a composition for forming polypropylene resin pellets is prepared using the above prepared homopolypropylene, and then, is extruded to prepare polypropylene pellets.

The composition for forming polypropylene resin pellets comprises the above described homopolypropylene, and it may optionally, further comprise an antioxidant.

As the antioxidant, an organometallice compound such as aluminum para-tert butyl benzoate, sodium benzoate, and calcium benzoate; a phenolic antioxidant such as tetrakis (methylene(3,5-di-t-butyl-4-hydroxy)hydrosilylate), 1,3,5-trimethyl-tris(3,5-di-t-butyl-4-hydroxybenzene), and pentaerythritol tetrakis(3-(3,5-di-t-butyl-4-hydroxyphenyl) propionate) (Irganox 1010®, BASF Corporation) may be mentioned, and one or a mixture of two or more may be used.

Among common antioxidants, the organometallic compound has excellent antioxidant property, and thus, when used in combination with the high flowability homopolypropylene, can prevent decomposition by heat or oxygen in the air, and thus, further improve fiber processability.

And, the phenolic antioxidant has excellent property of preventing decomposition by heat, compared to common antioxidants such as a phosphorus-based antioxidant. And, in the prior art, in the resin composition of powder type instead of pellet type, an antioxidant was added to polypropylene powder, and thus, uniformity of antioxidant distribution was deteriorated, and it was difficult to be distributed in the powder, thus deteriorating the effect, while in the present invention, the phenolic antioxidant is used in combination with the above described high flowability homopolypropylene, and thus, the antioxidant may be uniformly dispersed in the pellet type resin composition, thereby exhibiting more excellent thermal decomposition prevention effect and improving fiber processability.

More specifically, as the antioxidant, the organometallic compound and phenolic antioxidant may be used in combination, thereby further improving fiber processability.

In this case, the organometallic compound may be used in the amount of 0.01 to 1 wt %, based on the total weight of the polypropylene resin, and more specifically, it may be used in the amount of 0.01 to 0.1 wt %, based on the total weight of polypropylene resin.

And, the phenolic antioxidant may be used in the amount of 0.01 to 1 wt %, based on the total weight of polypropylene resin, and more specifically, it may be used in the amount of 0.1 to 0.5 wt %, based on the total weight of polypropylene resin.

And, the organometallic compound and phenolic antioxidant may be used at a weight ratio of 1:10 to 1:2, under conditions fulfilling the above described each content range.

Within the above content range, and mixing weight ratio, fiber processability of a polypropylene resin pellet may be further improved.

And, the composition may further comprise one or more additives such as a neutralizing agent, a slip agent, an anti-blocking agent, a UV stabilizer, an antistatic agent, and the like, in addition to the homopolypropylene, organimetallic compound, and phenolic antioxidant. The content of the additives is not specifically limited, but for example, it may be used respectively in the content of 500 ppm or more, or 700 ppm or more, and 2500 ppm or less, or 1500 ppm or less, based on the total weight of homopolypropylene.

Since the composition having the above construction comprises homopolypropylene having high flowability, it exhibits high melt index (MI) greater than 500 g/10 min, more specifically, greater than 500 g/10 min and 2000 g/10 min or less.

In the present invention, the melt index of the composition may be measured under load of 2.16 kg at 230° C. according to ASTM D1238, and is expressed as the weight (g) of polymer molten and flowing out for 10 minutes, as explained above.

Next, the composition is extruded to prepare a pellet type polypropylene resin.

The extrusion process may be conducted by a common method, except that a pellet die temperature is controlled to a range of 150 to 190° C.

Specifically, the extrusion process may be conducted using a common extruder, wherein the temperature and speed of the extruder barrel are not specifically limited, but for example, it may be conducted under conditions of 50 to 250° C. and 100 to 1000 rpm.

And, during the extrusion, the pellet die temperature decreases the temperature of molten resin, thus increasing the viscosity and enabling pelletization, but if the pellet die temperature is less than 150° C., homopolypropylene may not be sufficiently molten, and thus, pelletization may not be sufficiently achieved, or it may be solidified to block the inside of a die, thus deteriorating productivity. And, if the pellet die temperature is greater than 190° C., viscosity may become excessively low and the homopolypropylene may flow like fluid, and thus, cannot be cut to a pellet shape, thus rendering pellet preparation difficult. More specifically, the pellet die temperature may be 155° C. or more, or 160° C. or more, and 180° C. or less or 170° C. or less.

And, in case a pressure is controlled as well as the pellet die temperature, the pellet die pressure may be 20 bar or more, or 30 bar or more, and 50 bar or less, or 35 bar or less. Within the above range, the shape and properties of polypropylene resin pellet may be more easily realized.

In the case of a composition comprising homopolypropylene prepared using the conventional Ziegler-Natta catalyst, melt index (MI) before extrusion is low (200 g/10 min or less), but MI after extrusion may significantly increase to 500 g/10 min or more due to visbreaking according to the introduction of a decomposition accelerator. However, a composition comprising homopolypropylene according to the present invention may maintain high MI before extrusion greater than 500 g/10 min or more, even after extrusion, without conducting visbreaking. Specifically, in the preparation method according to the present invention, MI of the resin composition after extrusion, may be greater than 500 g/10 min, or 550 g/10 min or more, or 700 g/10 min or more, and 2000 g/10 min or less, or 1500 g/10 min or less, and MI of the composition before extrusion may be equal to or higher than MI of the composition after extrusion (MI of the composition before extrusion MI of the composition after extrusion).

Wherein, the MI of the composition before/after extrusion may be measured under load of 2.16 kg at 230° C. according to ASTM D1238, and may be expressed as the weight (g) of polymer molten and flowing out for 10 minutes.

The polypropylene resin pellet prepared by the above method comprises homopolypropylene and antioxidants, and exhibits the above explained properties, and thus, has excellent fiber processability without using a peroxide-based decomposition accelerator previously used for fiber preparation, and enables preparation of fine denier fiber. Thus, it is particularly useful in the field of preparation of fiber requiring excellent filer efficiency such as a filer or mask, and the like.

Thus, according to another embodiment of the invention, fiber, specifically non-woven fabric, prepared using the above polypropylene resin pellet is provided.

Meanwhile, the kind and content of homopolypropylene and antioxidants in the polypropylene resin pellet are as explained above.

Hereinafter, preferable Examples are presented for better understanding of the invention. However, these examples are presented only as the illustrations of the invention, and the scope of the present invention is not limited thereby.

Preparation Example 1: Preparation of a Catalyst

In a Schlenk flask, 3 g of silica was previously weighed, and then, 52 mmol of methylaluminoxane (MAO) was introduced, and reacted at 90° C. for 24 hours. After precipitation, the upper layer was removed and the remaining part was washed with toluene twice. 240 μmol of a transition metal compound (1a) of the following structure was dissolved in toluene and added to the reactor, and then, reacted at 70° C. for 5 hours. After the reaction was finished and precipitation was completed, the upper layer solution was removed, and the remaining reaction product was washed with toluene, and then, washed with hexane again and vacuum dried to obtain 5 g of a silica supported metallocene catalyst in the form of solid particles.

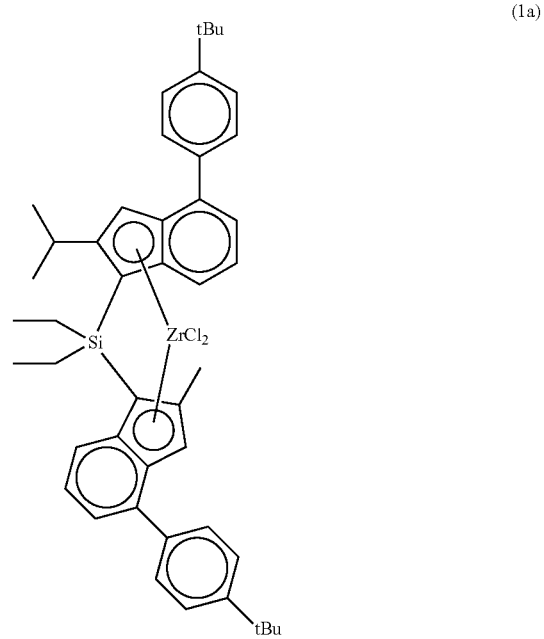

(1a)

Comparative Preparation Example 1: Preparation of a Catalyst

A silica supported metallocene catalyst was prepared by the same method as Preparation Example 1, except that a compound of the following structure (I) was used instead of the compound of the Chemical Formula 1a in Preparation Example 1.

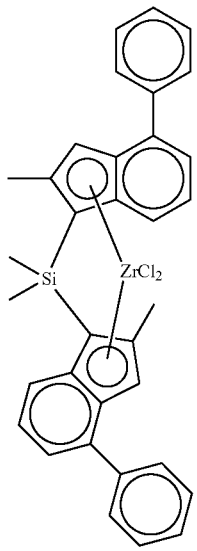

(I)

Example 1

Step 1: Preparation of Homopolypropylene

Bulk-slurry polymerization of propylene was progressed using continuous two loop reactors, in the presence of the silica supported metallocene catalyst prepared in Preparation Example 1. Wherein, triethylaluminum (TEAL) and hydrogen gas were introduced respectively using a pump, and the supported catalyst prepared above was used in the form of a mud catalyst mixed with oil and grease at the concentration of 16 wt %. While maintaining the temperature of the reactor at 70° C. and production amount per hour at 40 kg, homopolypropylene was prepared.

Step 2: Preparation of Polypropylene Resin Pellets

With the composition described in the following Table 1, homopolypropylene prepared above, calcium stearate as an organometallic compound, and Irganox 1010® (BASF Corporation) as a phenolic antioxidant were mixed to prepare a composition, which is then extruded using a twin screw extruder to prepare polypropylene resin pellets.
<Extrusion Conditions>
Screw speed: 150 rpm
Feed rate: 20 kg/hr
Extruder barrel temperature: sequentially control 50° C.→100° C.→150° C.→250° C.→200° C.→150° C.
Pellet die temperature: 160° C.
Pellet die pressure: 30 bar

Example 2

Polypropylene resin was prepared by the same method as Example 1, except that the homopolypropylene preparation conditions in the step 1 of Example 1 were modified as described in the following Table 1.

Examples 3 to 5

Polypropylene resin was prepared by the same method as Example 1, except that the homopolypropylene preparation conditions in the step 1 or extrusion conditions in the step 2 of Example 1 were modified as described in the following Table 1.

Comparative Example 1

Polypropylene resin pellets were prepared by the same method as Example 1, except that H7900® (LG Chem.) prepared using a Ziegler-Natta (Z/N) catalyst was used as homopolypropylene, and a decomposition accelerator Trigonox-101® (Akzonobel) was further introduced when preparing a composition.

Comparative Example 2

Polypropylene resin pellets were prepared by the same method as Example 1, except that H7912® (LG Chem.) prepared using a Ziegler-Natta (Z/N) catalyst was used as homopolypropylene, and a decomposition accelerator Trigonox-101® (Akzonobel) was further introduced when preparing a composition.

Comparative Example 3

Polypropylene resin pellets were prepared by the same method as Example 1, except that H7914® (LG Chem.) prepared using a Ziegler-Natta (Z/N) catalyst was used as homopolypropylene, and a decomposition accelerator Trigonox-101® (Akzonobel) was further introduced when preparing a composition.

Comparative Example 4

Polypropylene resin was prepared by the same method as Example 1, except that a silica supported metallocene catalyst prepared in Comparative Preparation Example 1 was used instead of the silica supported metallocene catalyst prepared in Preparation Example 1, in the step of Example 1.

Comparative Example 5 and 6

Polypropylene resin was prepared by the same method as Example 1, using the homopolypropylene prepared in the step 1 of Example 1, except that the pelletization conditions were modified as described in the following Table 1.

Specific propylene contents, 1-butene contents, and polymerization conditions, and the like in the process of preparing homopolypropylenes and resin compositions according to Examples 1 to 5, and Comparative Examples 1 to 6 were shown in the following Table 1.

TABLE 1

| | | Example | | | | | Comparative Example |
|---|---|---|---|---|---|---|---|
| | | 1 | 2 | 3 | 4 | 5 | 1 |
| Preparation of | Catalyst | Preparation Example 1 | Preparation Example 1 | Preparation Example 1 | Preparation Example 1 | Preparation Example 1 | Z/N |

TABLE 1-continued

| | | | | | | | |
|---|---|---|---|---|---|---|---|
| homopoly-propylene | Catalyst amount (cc/hr) | 7.0 | 6.5 | 7.5 | 7.0 | 6.5 | 7.9 |
| | Polymerization temperature (° C.) | 70 | 70 | 65 | 70 | 70 | 70 |
| | Pressure (kg/cm²) | 35 | 35 | 35 | 35 | 35 | 35 |
| | Propylene input (kg/hr) | 40 | 40 | 40 | 40 | 40 | 40 |
| | TEAL input (g/hr) | 50 | 50 | 50 | 50 | 50 | 50 |
| | Hydrogen input (ppm) | 700 | 900 | 700 | 500 | 850 | 7,000 |
| Preparation process of polypropylene resin | Organometallice compound (wt %) | 0.02 | 0.02 | 0.02 | 0.02 | 0.02 | 0.02 |
| | Phenolic antioxidant (wt %) | 0.10 | 0.10 | 0.10 | 0.10 | 0.10 | 0.10 |
| | Decomposition accelerator (wt %) | — | — | — | — | — | 0.8 |
| | Pellet die temperature (° C.) | 160 | 160 | 160 | 160 | 150 | 160 |
| | MI of composition before extrusion (g/10 min) | 850 | 1,390 | 980 | 600 | 1,250 | 125 |
| | MI of composition after extrusion (g/10 min) | 790 | 1,310 | 950 | 560 | 1,180 | 1,150 |

| | | | Comparative Example | | | | |
|---|---|---|---|---|---|---|---|
| | | | 2 | 3 | 4 | 5 | 6 |
| | Preparation of homopoly-propylene | Catalyst | Z/N | Z/N | Preparation Example 1 | Preparation Example 1 | Preparation Example 1 |
| | | Catalyst amount (cc/hr) | 7.9 | 7.9 | 15.1 | 7.0 | 7.0 |
| | | Polymerization temperature (° C.) | 70 | 70 | 70 | 70 | 70 |
| | | Pressure (kg/cm²) | 35 | 35 | 35 | 35 | 35 |
| | | Propylene input (kg/hr) | 40 | 40 | 40 | 40 | 40 |
| | | TEAL input (g/hr) | 50 | 50 | 50 | 50 | 50 |
| | | Hydrogen input (ppm) | 7,000 | 7,000 | 1400 | 700 | 700 |
| | Preparation process of polypropylene resin | Organometallice compound (wt %) | 0.02 | 0.02 | 0.02 | 0.02 | 0.02 |
| | | Phenolic antioxidant (wt %) | 0.10 | 0.10 | 0.10 | 0.10 | 0.10 |
| | | Decomposition accelerator (wt %) | 0.8 | 0.8 | — | — | — |
| | | Pellet die temperature (° C.) | 160 | 160 | 160 | 200 | 140 |
| | | MI of composition before extrusion (g/10 min) | 127 | 119 | 1,280 | 850 | 850 |

TABLE 1-continued

| | | | | | | |
|---|---|---|---|---|---|---|
| MI of composition after extrusion (g/10 min) | 1,380 | 1,130 | ND | ND | NA | |

In the Table 1, wt % is a value based on the total weight of polypropylene resin. And, melt index (MI) of the composition before/after extrusion was measured under load of 2.16 kg at 230° C. according to ASTM D1238, and expressed as weight (g) of polymer molten and flowing out for 10 minutes.

And, ND means that MI could not be measured because normal pellets were not prepared after extrusion. And, NA means that resin was not normally molten and extrusion was not achieved.

As shown in the Table 1, in the case of polypropylene resins of Examples 1 to 5 according to the present invention, although MI of the compositions after extrusion decreased, MI of the composition after extrusion was greater than 500 g/10 min, thus exhibiting high flowability.

To the contrary, in the case of Comparative Examples 1 to 3 comprising homopolypropylene prepared using the existing Ziegler Natta catalyst, wherein a visbreaking process using a decomposition accelerator was used during extrusion, flowability of 200 g/10 min or less was exhibited before extrusion, and MI significantly increased after extrusion.

And, in the case of Comparative Example 4 comprising homopolypropylene prepared using a metallocene catalyst similarly to the present invention, normal pellets were not prepared after extrusion, meaning that MI could not be measured.

And, in the case of Comparative Example 5 comprising homopolypropylene prepared identically as in the present invention, due to high pellet die temperature, normal pellets were not prepared after extrusion, and in the case of Comparative Example 6, due to low pellet die temperature, resin was not normally molten, and thus, extrusion was not achieved.

Experimental Example 1: Evaluation of the Properties of Polypropylene Resin Pellet For the polypropylene resins prepared in Examples and Comparative Examples, the properties were evaluated as follows, and the results were shown in the following Table 2.

(1) Melt index (MI, 2.16 kg): measured under load of 2.16 kg at 230° C. according to ASTM D1238, and expressed as the weight (g) of polymer molten and flowing out for 10 minutes.

(2) Melting point (Tm): The temperature of polypropylene resin was increased to 200° C., and maintained for 5 minutes, and then, decreased to 30° C., and increased again, and the top of DSC (Differential Scanning calorimeter, TA Instruments) curve was determined as a melting point. Wherein, the temperature increase and decrease rates are respectively 10° C./min, and the result measured in the second temperature rise section was used as a melting point.

(3) Crystallization temperature (Trc): The temperature of polypropylene resin was increased to 200° C. and maintained for 5 minutes, and then, decreased to 30° C., increased to 200° C. again at 10° C./min, and decreased again at 10° C./min, and the top of Differential Scanning calorimeter (TA Instruments) curve in the temperature decrease section at 10° C./min was determined as a crystallization temperature.

(4) Xylene Soluble (wt %): Xylene was introduced into each polypropylene resin prepared according to Examples and Comparative Examples, heated at 135° C. for 1 hour, and cooled for minutes to progress pretreatment. In OminiSec (Viscotek corporation FIPA) device, xylene was flowed at a flow rate of 1 mL/min for 4 hours, and when the base lines of RI, DP, IP were stabilized, the concentration and injection amount of the pretreated sample were recorded and measured, and then, the peak areas were calculated.

(5) Yellow Index: measured according to ASTM D1925.

(6) Weight average molecular weight (Mw), number average molecular weight (Mn) and molecular weight distribution (MWD, polydispersity index): The weight average molecular weight (Mw) and number average molecular weight (Mn) of polymer were measured using GPC (gel permeation chromatography), and molecular weight distribution (MDW, Mw/Mn) was calculated by dividing the measured weight average molecular weight by the number average molecular weight.

Specifically, as the gel permeation chromatography (GPC) device, Waters PL-GPC220 was used, and Polymer Laboratories PLgel MIX-B 300 mm length column was used. Wherein, measuring temperature was 160° C., 1,2,4-trichlorobenzene was used as a solvent, and flow rate was set as 1 mL/min. And the polymer samples were respectively prepared in the concentration of 10 mg/10 mL, and then, fed in an amount of 200 μL. Using a calibration curve formed using a polystyrene standard specimen, Mw and Mn values were derived. Wherein, as the polystyrene standard specimen, 9 kinds having weight average molecular weight of 2,000 g/mol/10,000 g/mol/30,000 g/mol/70,000 g/mol/200,000 g/mol/700,000 g/mol/2,000,000 g/mol/4,000,000 g/mol/10,000,000 g/mol were used.

TABLE 2

| | Example | | | | | Comparative Example | | | | | |
|---|---|---|---|---|---|---|---|---|---|---|---|
| | 1 | 2 | 3 | 4 | 5 | 1 | 2 | 3 | 4 | 5 | 6 |
| MI (g/10 min) | 790 | 1,310 | 950 | 560 | 1,180 | 1,150 | 1,380 | 1,130 | ND | ND | ND |
| Tm (° C.) | 156 | 157 | 156 | 156 | 157 | 160 | 161 | 160 | 153 | 156 | 156 |

TABLE 2-continued

| | Example | | | | | Comparative Example | | | | | |
|---|---|---|---|---|---|---|---|---|---|---|---|
| | 1 | 2 | 3 | 4 | 5 | 1 | 2 | 3 | 4 | 5 | 6 |
| Trc (° C.) | 120 | 121 | 121 | 120 | 121 | 119 | 118 | 120 | 110 | 120 | 120 |
| Xylene soluble (wt %) | 0.7 | 0.6 | 0.5 | 0.7 | 0.7 | 1.8 | 1.8 | 2.0 | 0.6 | 0.8 | 0.8 |
| Yellow index | −1.2 | −1.2 | −1.3 | −1.2 | −1.3 | −1.2 | −1.2 | −1.1 | −1.2 | −1.0 | −1.0 |
| Mn (g/mol) | 20,100 | 17,100 | 18,900 | 22,100 | 17,700 | 15,000 | 13,500 | 13,000 | 17,900 | 19,900 | 19,900 |
| Mw (g/mol) | 44,200 | 38,000 | 42,100 | 48,200 | 39,200 | 67,000 | 53,500 | 52,100 | 38,400 | 43,100 | 43,100 |
| MWD | 2.20 | 2.22 | 2.23 | 2.18 | 2.21 | 4.48 | 3.96 | 3.97 | 2.19 | 2.17 | 2.17 |

In the Table 2, ND means not detected.

Experimental Example 2

The shapes of polypropylene resins prepared in Examples and Comparative Examples were observed, and the observed images were shown in FIGS. 1 to 6.

And, 10 diameters of the polypropylene resin confirmed from the observed images, namely, the longest distances among any straight distances of the outer circumference surface were measured, and the average value was calculated. Based on the average diameter of 2 mm, those having a diameter of 2 mm or more were classified as a pellet, and those having a diameter less than 2 mm were classified as powder.

And, draw diameter was measured as follows, and the results were shown in the following Table 3 and FIGS. 7 to 12.

In order to exactly measure the draw diameter, DHR (Discovery Hybrid Rheometer) of TA Instruments was used. The polypropylene resins prepared in Examples and Comparative Examples were dissolved and load between the upper and lower plates of DHR (temperature: 170° C., initial diameter of polypropylene resin loaded between the upper and lower plates: 8 mm, initial thickness: 1.5 mm).

While raising up the upper plate of DHR at a drawing speed of 10 mm/s, molten polypropylene resin loaded between the upper and lower plates was drawn, and it was photographed with an ultra-high speed camera (Crashcam 1520®, IDT Corporation), and the diameter of polypropylene resin during drawing was measured by image analysis (analysis tool: ImageJ).

1 to 3 had pellet shapes, the draw diameters were greater than 0.4 mm, and thus, fiber processability was deteriorated compared to Examples. And, although Comparative Examples 4 to 6 exhibited decreased draw diameter compared to Comparative Examples 1 to 3, they were prepared as powders, and thus, could not be practically applied for products.

The invention claimed is:

1. A polypropylene resin pellet comprising a homopolypropylene, wherein the polypropylene resin pellet fulfills the following requirements:
   a melt index measured under load of 2.16 kg at 230° C. according to ASTM D1238: greater than 500 g/10 min,
   a melting point: 155° C. or more,
   a xylene soluble: 1 wt % or less, and
   a draw diameter measured at a temperature of 170° C. and drawing speed of 10 mm/s using Discovery Hybrid Rheometer: 0.3 mm or less.

2. The polypropylene resin pellet according to claim 1, wherein the melt index of the polypropylene resin pellet, measured under load of 2.16 kg at 230° C. according to ASTM D1238, is 1500 g/10 min or less, and the melting point of the polypropylene resin pellet is 170° C. or less.

3. The polypropylene resin pellet according to claim 1, wherein a molecular weight distribution of the polypropylene resin pellet is 3 or less.

4. The polypropylene resin pellet according to claim 1, wherein a molecular weight distribution of the polypropylene resin pellet is 2.0 to 2.4,

TABLE 3

| | Example | | | | | Comparative Example | | | | | |
|---|---|---|---|---|---|---|---|---|---|---|---|
| | 1 | 2 | 3 | 4 | 5 | 1 | 2 | 3 | 4 | 5 | 6 |
| Shape | pellet | Pellet | pellet | pellet | pellet | pellet | pellet | pellet | Powder | Powder | Powder |
| Average diamater (mm) | 3.5 | 3.1 | 3.5 | 3.9 | 3.3 | 3.9 | 4.1 | 4.1 | 0.9 | 1.4 | 1.4 |
| Draw diameter (mm) | 0.282 | 0.276 | 0.280 | 0.295 | 0.273 | 0.475 | 0.436 | 0.422 | 0.290 | 0.291 | 0.291 |

As the results of experiment, it can be confirmed that the polypropylene resin pellets of Examples 1 to 5 according to the present invention exhibit small draw diameter and thus enables preparation of fine denier fiber. To the contrary, although the polypropylene resins of Comparative Examples a weight average molecular weight of the polypropylene resin pellet is 60,000 g/mol or less, and a number average molecular weight of the polypropylene resin pellet is 16,000 to 25,000 g/mol.

5. The polypropylene resin pellet according to claim 1, wherein a crystallization temperature of the polypropylene resin pellet is 115° C. or more.

6. The polypropylene resin pellet according to claim 1, wherein the polypropylene resin pellet further comprises, based on the total weight of the polypropylene resin pellet, 0.01 to 1 wt % of an organometalic compound, and 0.01 to 1 wt % of a phenolic antioxidant, and
the mixing weight ratio of the organometallic compound and phenolic antioxidant is 1:10 to 1:2.

7. The polypropylene resin pellet according to claim 6, wherein the organometallic compound includes one or more compounds selected from calcium stearate, aluminum para-tert-butyl benzoate, sodium benzoate, or calcium benzoate, and
the phenolic antioxidant includes pentaerythritol tetrakis (3-(3,5-di-t-butyl-4-hydroxyphenyl)propionate).

8. A method for preparing the polypropylene resin pellet according to claim 1, comprising steps of:
polymerizing propylene monomers in the presence of a catalyst composition comprising a transition metal compound represented by Chemical Formula 1, to prepare the homopolypropylene; and
preparing a composition comprising the homopolypropylene, and then, extruding at a pellet die temperature of 150 to 190° C.,

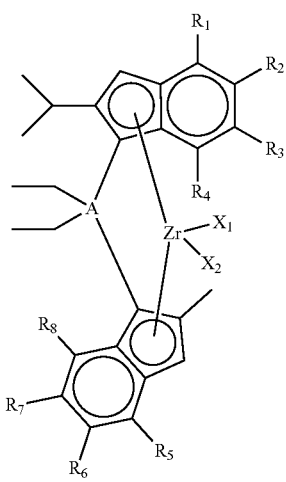

[Chemical Formula 1]

in the Chemical Formula 1,
$X_1$ and $X_2$ are each independently, a halide,
$R_1$ and $R_5$ are each independently, a $C_{6-20}$ aryl substituted with a $C_{1-20}$ alkyl,
$R_2$ to $R_4$ and $R_6$ to $R_8$ are each independently, hydrogen, a halogen, a $C_{1-20}$ alkyl, a $C_{2-20}$ alkenyl, a $C_{1-20}$ alkylsilyl, a $C_{1-20}$ silylalkyl, a $C_{1-20}$ alkoxysilyl, a $C_{1-20}$ ether, a $C_{1-20}$ silylether, a $C_{1-20}$ alkoxy, a $C_{6-20}$ aryl, a $C_{7-20}$ alkylaryl, or a $C_{7-20}$ arylalkyl, and
A is carbon, silicon or germanium.

9. The method for preparing the polypropylene resin pellet according to claim 8, wherein A is silicon, and
$R_1$ and $R_5$ are each independently, a phenyl group substituted with a $C_{3-6}$ branched alkyl group.

10. The method for preparing the polypropylene resin pellet according to claim 8, wherein the compound of the Chemical Formula 1 is represented by Chemical Formula 1a,

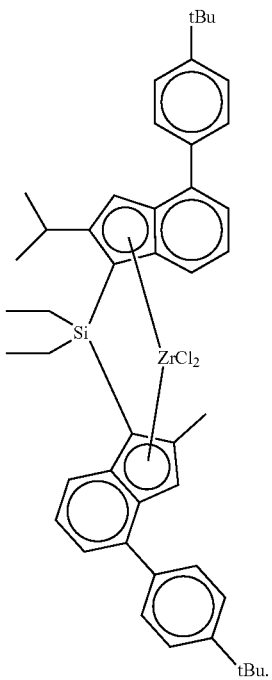

[Chemical Formula 1a]

11. The method for preparing polypropylene resin pellet according to claim 8, wherein the catalyst composition further comprises a silica carrier; and a cocatalyst, and
the cocatalyst comprises a compound represented by Chemical Formula 2, a compound represented by Chemical Formula 3, a compound represented by Chemical Formula 4, or a mixture thereof,

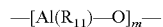

[Chemical Formula 2]

in the Chemical Formula 2,
$R_{11}$ is identical to or different from each other, and each independently, a halogen; a $C_{1-20}$ hydrocarbon; or a $C_{1-20}$ hydrocarbon substituted with a halogen; and
m is an integer of 2 or more;

[Chemical Formula 3]

in the Chemical Formula 3,
$R_{12}$ is identical to or different from each other, and each independently, a halogen; a $C_{1-20}$ hydrocarbon; or a $C_{1-20}$ hydrocarbon substituted with a halogen; and
J is aluminum or boron;

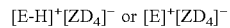

[Chemical Formula 4]

in the Chemical Formula 4,
E is each independently a neutral or cationic Lewis base;
H is a hydrogen atom;
Z is a Group 13 element; and
D is identical to or different from each other, and each independently, a $C_{6-20}$ aryl group or a $C_{1-20}$ alkyl group of which one or more hydrogen atoms are optionally substituted with a halogen, a $C_{1-20}$ hydrocarbon, an alkoxy or a phenoxy.

12. The method for preparing the polypropylene resin pellet according to claim 8, wherein the polymerization is conducted while introducing hydrogen gas in an amount of 500 to 2500 ppm, based on the total weight of the propylene monomers.

13. The method for preparing the polypropylene resin pellet according to claim 8, wherein melt indexes of the composition before and after the extrusion, measured under load of 2.16 kg at 230° C. according to ASTM D1238, are respectively greater than 500 g/10 min and 2000 g/10 min or less, and the melt index before the extrusion is greater than or equal to the melt index after the extrusion.

14. The method for preparing the polypropylene resin pellet according to claim 8, wherein an organometallic compound and a phenolic antioxidant are further introduced, when preparing the composition comprising the homopolypropylene.

15. Fiber prepared from the polypropylene resin pellet according to claim 1.

* * * * *